United States Patent Office 3,352,961
Patented Nov. 14, 1967

3,352,961
CABLE CLAMP
Hans Simon, Bruchhausener Strasse 5463,
Unkel (Rhine), Germany
Filed Jan. 25, 1965, Ser. No. 427,723
9 Claims. (Cl. 174—65)

The present invention relates to improvements in cable clamps for frictionally engaging an electrical cable to relieve tension thereon during its passage into various electrical housings, and various electrical machines and apparatus. The invention briefly includes a cable clamp formed of synthetic resin plastic material having a plurality of jaws connected by relatively thin portions which are adapted to be compressed and urged into frictional engagement with the insulation of an electrical cable and thereby hold the same in position against tension exerted on the cable. Also, the invention embodies a tubular extension adapted to engage the cable in spaced relation from the gripping jaws to prevent twisting of the cable and the resulting kinking thereof.

This invention relates to cable inlets with tension relief for the housings of electrical machines and apparatus, which inlets may if required also be provided with a protection against kinking.

Cable lead-in sockets which may be designed at the same time to give protection against kinking are known, as are cable leading-in terminals with tension relief. However, these have the drawback of a small clamping range, i.e. cables of different thicknesses require different sizes of lead-in means, with the result that serious consequences occur, that is the need to keep large stocks and difficulties when leads are changed.

The purpose of the invention is to remove these disadvantages and provide a cable inlet clamp which simultaneously relieves tension on the cable and provides kinking protection for the cable and has a considerable clamping range to accommodate cables of different diameters.

According to the invention, this is achieved by means of a clamping and holding body of thermoplastic synthetic material for frictionally engaging the cable, which body is composed of a plurality of gripping jaws grouped around a central orifice and shaped as double wedges or double cones and which jaws are connected by foldable relatively thin, foil-like walls. The foil-like walls can be produced in one piece with the jaws, for example by the injection-moulding process, or be joined to them subsequently by adhesive bonding, cementing, welding or the like.

According to another form of the invention, an improvement in the pull-relieving effect is obtained by means increasing the static friction, such as clamping ribs or the like, on the insides of the jaws, which ribs, for example, may extend transversely of and/or parallel to the axis of the cable.

Various means and possibilities of construction are provided for pressing the clamping and holding bodies against the cable and securing them to the wall of a housing. One of these consists of a securing and pressure-applying cap having a central lead-in orifice and adapted, by means of pressure-applying screws, to grip the clamping and holding body tightly between it and the wall of a housing and press the said clamping and holding body against the cable.

Another possible method of securing the clamping and holding bodies is afforded by a two-part, stuffing-box-like lead-in socket between these parts, which are adjustable with respect to one another, for example by means of screw-threads, the clamping and holding body can be compressed and one part of which can be screwed to, or into, the wall of a housing.

A particularly simple construction employs a clamping plate which can be screwed to the wall of a housing at a variable distance and has a lead-in orifice in alignment with the hole in the wall of the housing for pressing the clamping and holding body in between the said wall and the clamping plate. In the latter case, it may also be advantageous to provide flat top and bottom extensions on the jaws of the clamping and holding body.

An advantageous construction is obtained by the use of conical clamping surfaces on the holding means for the clamping and holding body and/or on the lead-in orifice in the wall of the housing.

Owing to the arrangement of the cable inlet in accordance with the invention, the possibility is furthermore obtained of providing a socket known per se giving protection against kinking, the retaining collar of which may if required be shaped to correspond to the conical clamping surfaces on the holding means.

The invention will be described more fully with reference to several examples illustrated diagrammatically in the accompanying drawings in which.

Figure 1:
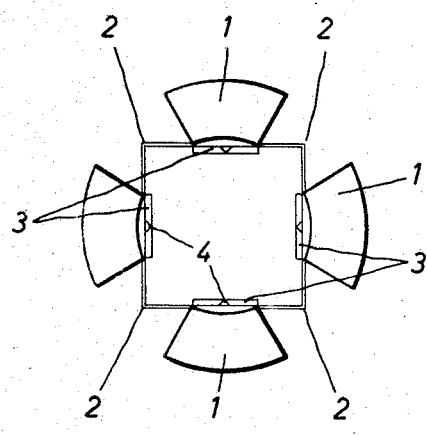
FIGURE 1 is a plan view of a clamping and holding body in the position of maximum spread or extension.
Figure 2:
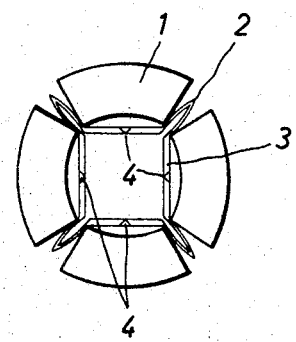
FIGURE 2 shows the said body in the pushed-together state.
Figure 3:
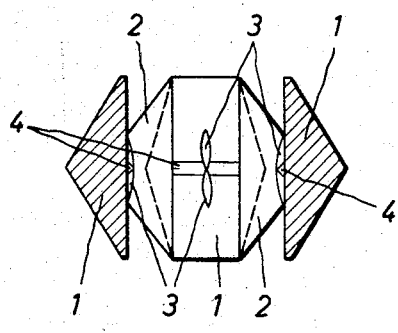
FIGURE 3 is a vertical section through the same.

Referring now to the drawings, but first more particularly to FIGURES 1 to 3, the clamping and holding body consists of four sections 1 which are arcuate or have the form of part of a circle in plan view and are shaped as double cones or double wedges in cross-section, the said sections being connected by means of relatively thin foldable, foil-like walls 2 and having on their inside clamping ribs 3 extending transversely of the axis of the cable and parallel ribs 4. Owing to the foldable connecting foils, the effective opening between the sections 1 can be varied to a very considerable extent, approximately in a ratio of 1:2.5.

Figure 4:
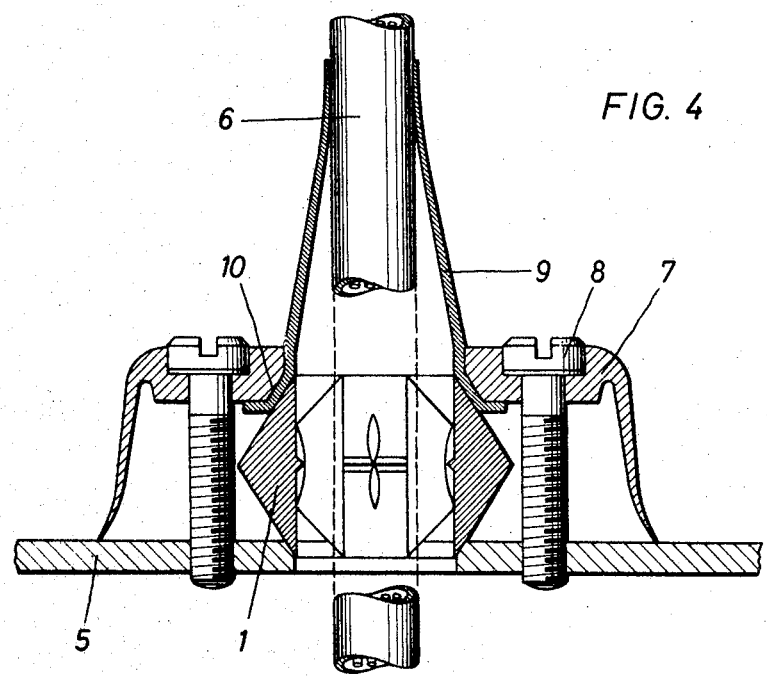
FIGURES 4 and 5 are vertical sections in different planes through a cable inlet with securing cap at different stages of application of pressure.
Figure 5:
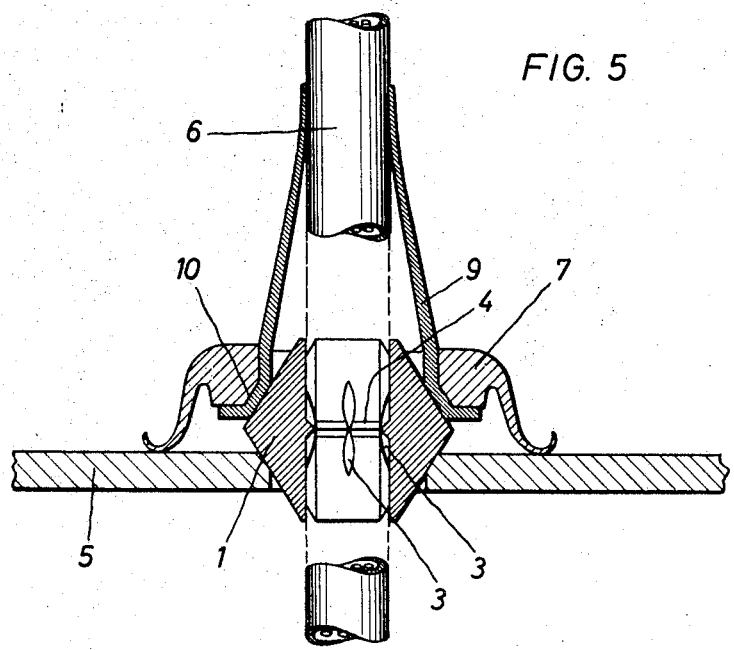

As shown in FIGURES 4 and 5, this is utilized in the following manner to form a pull-relieved cable inlet. The clamping and holding body formed out of the sections 1 and the relatively thin walls 2 is inserted between a hole in the wall 5 of a housing and a securing and pressure-applying cap 7, and the cap is secured to the wall 5 of the housing by means of clamping screws 8. At the same time, a socket 9 giving protection against kinking, retaining collar 10 of which socket is provided with correspondingly shaped inclined surfaces, that are conical and form clamping surfaces, and the socket 9 may also be inserted between the cap 7 and the clamping jaws 1.

The cable 6 may be pushed through either before the cap 7 is attached or, more suitable, after this has been done, but before the cap is tightened. By tightening the screws 8, the conical surfaces 10 slide over the co-operating conical surfaces of the jaws 1 and push the latter together towards the center, so that the inner surfaces of the jaws bear on the cable, it being also possible to increase the static friction by means of the clamping ribs 3, 4.

As will be seen from FIGURE 5, the cap 7 is provided with a sealing lip extending all around the same, the said sealing lip being pressed against the wall 5 of the housing when the screws are tightened and curling outwardly to a greater or lesser extent in the process. The best possible sealing action against water and dust is obtained both thereby and by the use of the socket 9. The kinking protection and the pull relief meet all demands that can be made.

Figure 6:
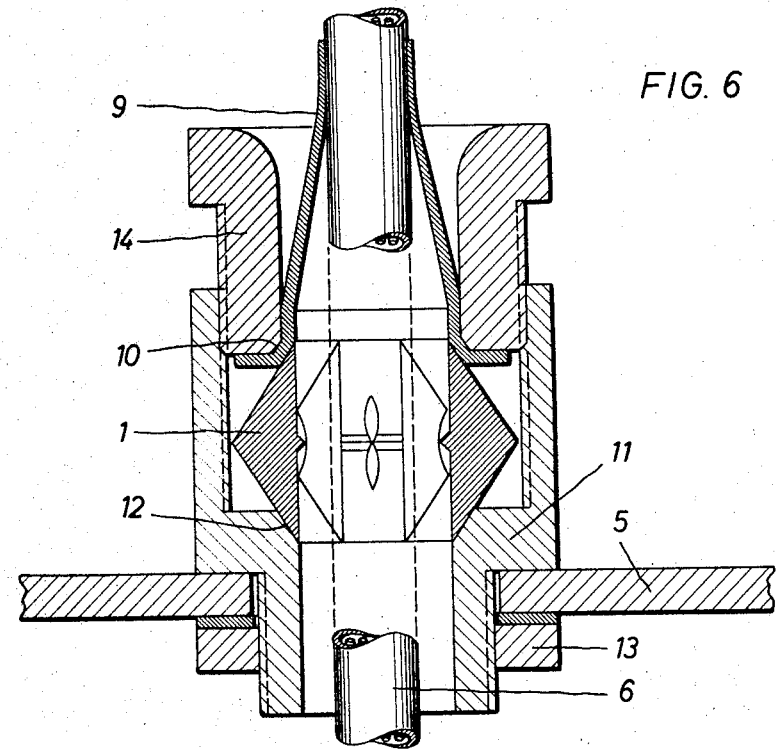
FIGURE 6 is a vertical section through a cable inlet having a stuffing-box-like lead-in socket which is screwed to the wall of a housing by means of a nut.

Another method of fixing is shown in FIGURE 6. In this case, the clamping and holding body having the jaws 1 is held between parts 11 and 14 of a stuffing-box-like lead-in, it being again possible to employ conical clamping surfaces 10 and a socket 9 giving protection against kinking. The necessary bearing pressure is produced by screwing the threaded nipple 14 into the stuffing box 11; the stuffing box itself being retained by means of a nut 13 behind the inlet wall 5. With the necessary changes, fitting and operation are the same as in the preceding embodiment.

Figure 7:
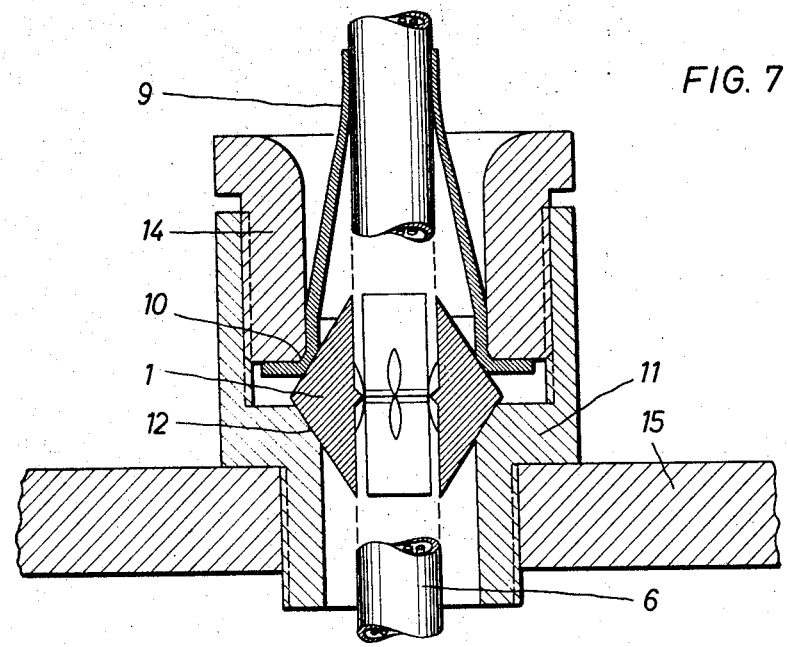
FIGURE 7 shows a similar socket which is screwed into the wall of a housing.

The constructional form according to FIGURE 7 differs from the last one only in that the stuffing box 11 is screwed into a threaded hole in the wall 15.

Figure 8:
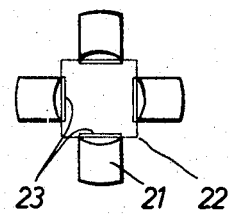
FIGURE 8 is a plan view of a somewhat modified form of the clamping and holding body in the spread-open or extended state.
Figure 9:
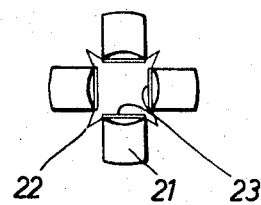
FIGURE 9 is a plan view of the same in the partially pushed-together state.
Figure 10:
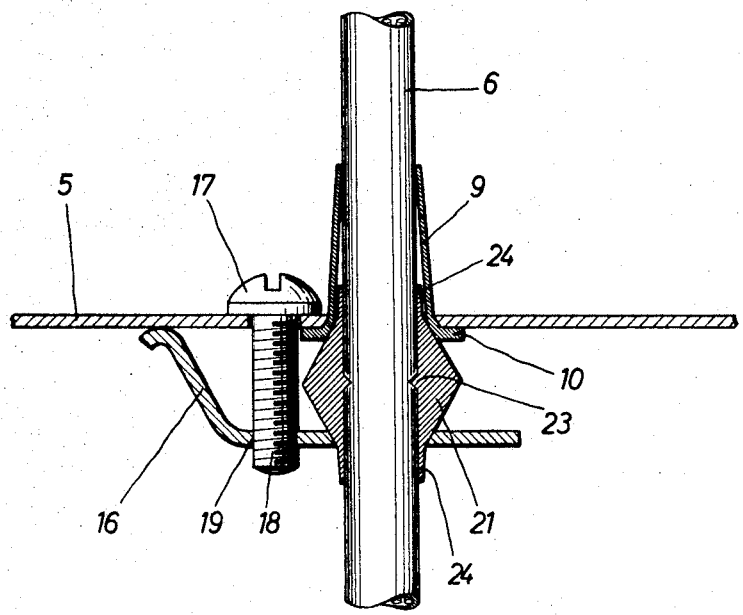
FIGURE 10 shows in vertical section the method of fixing the gripping jaws to a housing by means of a clamping plate.

FIGURES 8 and 9 show a somewhat different constructional form of the clamping and holding body according to FIGURES 1 and 2. In this instance the clamping jaws 21 are simply rounded at the inside and outside, while the lateral surfaces are cut away parallel to one another. The relatively thin foil wall 22 is foldable in the same way as in the previous example. Only transverse ribs 23 are provided on the insides of the clamping jaws 21. Moreover, as will be seen from FIGURE 10, this clamping and holding body has flat top and bottom extensions 24 on the jaws 21 for guiding the parts into position during mounting. This is effected by means of a clamping plate 16 which can be fixed to the wall of the housing at a variable distance by means of a screw 17, namely by screw-thread 18 being screwed into a threaded hole 19 in the clamping plate 16 to a greater or lesser depth. By means of a lateral supporting lug which is formed by a bent portion of the clamping plate 16, the latter is supported against the wall 5 of the housing and, when the screw is tightened, has a certain tendency to become deflected, so that the clamping and holding body, that is the clamping jaws 21, can be pressed tightly against the wall 5 of the housing all round, and in fact is simply accomplished by means of a single screw. In this case likewise a socket 9 giving protection against kinking can be employed. For mounting purposes, the anti-kinking socket 9 is first inserted; through the opening in the wall 5 of the housing from the inside and the clamping and holding body is inserted behind it, this being held by the clamping plate 16, but not yet pressed tight. The cable is then pushed through and the screw 17 is tightened. In this way the cone-like clamp is positively closed, grips the cable 6 tightly between the jaws 21 and also clamps the anti-kinking socket 9 in position. In this way large-area clamping of the cable 6 is obtained, without the possibility of the sheath being damaged, and immovable seating of the anti-kinking socket is also obtained.

What I claim is:

1. A strain and tension relieving cable clamp for electrical housings having a wall provided with an opening for said cable adapted for use with electrical machines and apparatus, comprising a clamping and holding body formed of thermoplastic synthetic material for frictionally engaging the cable, said body being composed of a plurality of jaws grouped around a central orifice and shaped as double wedges forming opposed double cones on the external surface, each of said jaws being connected one to the other by foldable relatively thin foil-like walls.

2. A cable clamp according to claim 1, wherein each of said jaws is provided on its internal surface with clamping ribs.

3. A cable clamp according to claim 1, wherein a pressure applying cap having a central lead in orifice for the cable is provided and pressure applying screws are employed for clamping the same to said housing wall to exert a force on said clamping and holding body and grip the clamping and holding body tightly therebetween and a wall of the housing to press said clamping and holding body into frictional engagement with the cable.

4. A cable clamp as set forth in claim 1 wherein said wall is provided with a two part stuffing-box-type lead in socket in which the two parts are threadedly connected and adjustable with respect to one another, said clamping and holding body being mounted in said socket, and one part of said two part socket being threaded into the opening of said housing wall.

5. A cable clamp according to claim 1, wherein a clamping plate is provided with a lead in orifice, screw threaded fastener means for connecting said clamping plate to said housing wall with the opening and lead in orifice in alignment, said clamping and holding body being mounted between said wall and the clamping plate whereby said threaded fastener means will exert a pressure on said clamping and holding body and exert a force thereon to frictionally engage said cable.

6. A cable clamp as set forth in claim 1, wherein said clamping and holding body jaws are provided with circular extensions at the top and bottom thereof.

7. A cable clamp as set forth in claim 3, wherein said cap and wall are provided with conical clamping surfaces for engaging the jaws of the clamping and holding body.

8. A cable clamp as set forth in claim 4, wherein the internal surfaces of the two part stuffing-box-type is provided with opposed conical surfaces for engaging the correspondingly shaped double cone surfaces on the jaws of said clamping and holding body.

9. A cable clamp as set forth in claim 1, wherein means is provided for clamping said clamping and holding body to said wall and in which an anti-kinking socket is provided with a retaining collar shaped to correspond to a conical clamping surface on said clamping means.

References Cited

UNITED STATES PATENTS

| | | | |
|---|---|---|---|
| 1,714,590 | 9/1929 | Dake. | |
| 2,320,813 | 6/1943 | Cowles | 285—382.7 X |
| 2,369,413 | 2/1945 | Rusz | 174—65 X |
| 2,430,809 | 11/1947 | Flora et al. | 248—56 |
| 2,455,202 | 11/1948 | Ware | 277—206 X |
| 2,651,529 | 9/1953 | Wayman | 174—56 X |
| 3,235,276 | 2/1966 | Leonard | 174—135 X |

FOREIGN PATENTS 190,063   6/1964   Sweden.

LEWIS H. MYERS, Primary Examiner.

H. W. COLLINS, D. A. TONE, Assistant Examiners.